Patented Feb. 25, 1936

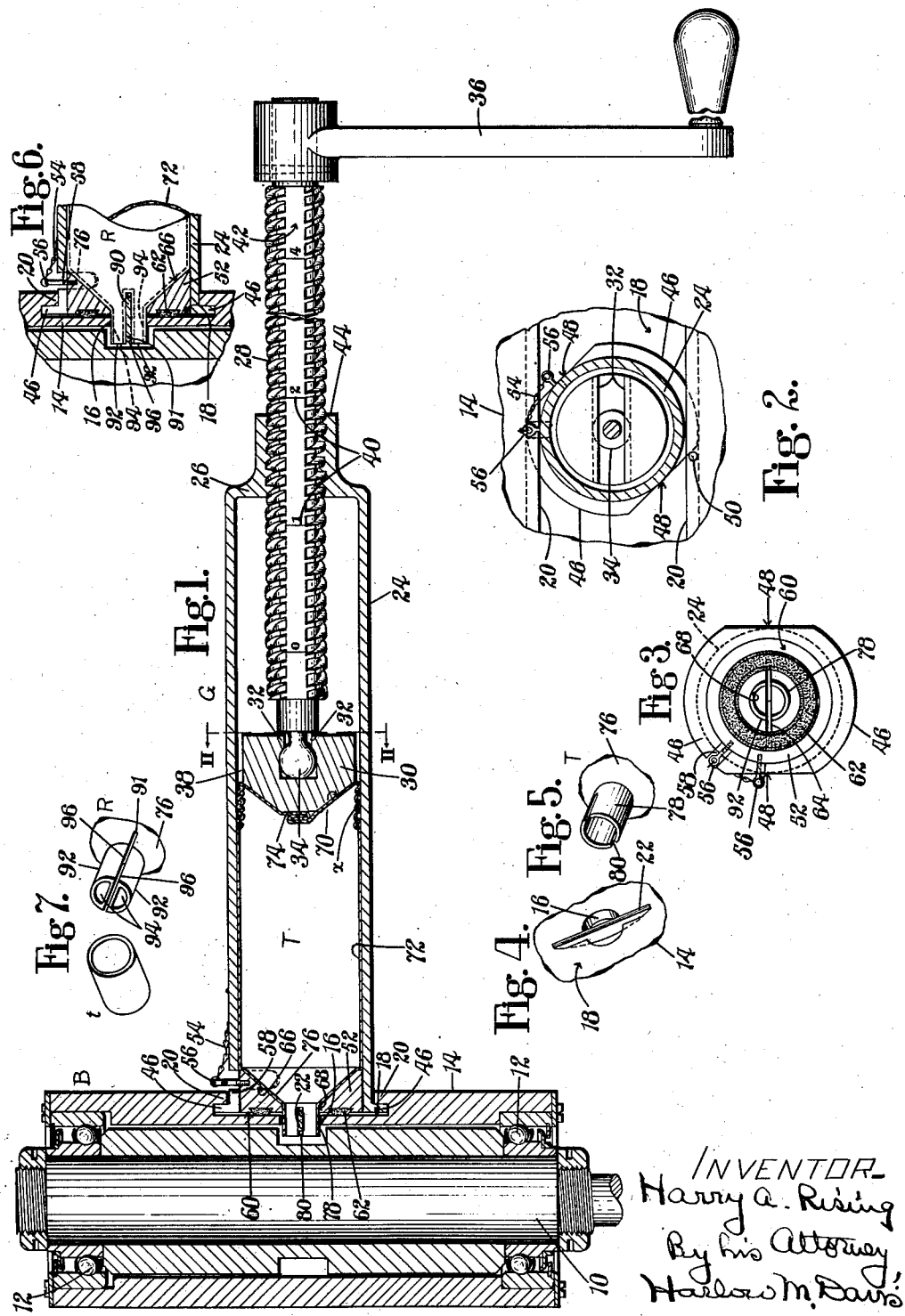

2,031,671

UNITED STATES PATENT OFFICE 2,031,671

LUBRICATING SYSTEM

Harry A. Rising, Beverly, Mass., assignor to United Shoe Machinery Corporation, Paterson, N. J., a corporation of New Jersey Application August 19, 1932, Serial No. 629,531

27 Claims. (Cl. 184—1)

My invention relates to systems for lubricating bearings and the like, it being especially concerned with the application of such a heavy lubricant as grease.

It is in the interest of manufacturers of machinery, and particularly those who lease machines and maintain them in operating condition, that only a good lubricant of the correct grade shall be used in the machine-bearings, to minimize wear and exclude impurities which might injure the metal, as by corrosion. An object of my invention is to insure the application to the parts to be lubricated of an approved lubricant only and to generally improve the delivery of heavy lubricants.

For the attainment of the object, a feature of the invention involves a combination in which a lubricant-applying device or gun, arranged to receive a collapsible tube containing the lubricant to be applied, co-operates with a bearing to deliver the lubricant to an opening therein, the bearing having means for engagement with both the applying device and the tube. The collapsible tube is contained in a chamber or cylinder in the applying device and is acted upon by an extruding means or plunger operating in the cylinder. Preferably, the bearing and the delivery-end-formations of both the applying device and tube have complemental engaging means, which permit the association of the applying device and tube with the bearing to deliver to its receiving opening, such engaging means upon the bearing preventing effective association with the opening of applying devices and tubes having different end-formations from those complemental to the engaging means of the bearing. Thus, only an approved lubricant, packaged in tubes and applied by devices, when the latter are employed, designed for selective association with the bearing to be lubricated, can be caused to deliver to such bearing. The form of engaging means illustrated herein consists of a bar extending across the bearing-opening, this bar being received by a slot in the grease-gun or applying device and a like slot in the nozzle of the lubricant-tube in the gun. To most certainly avoid the escape and waste of the lubricant between the tube and the bearing, said tube may have a plurality of delivery-openings, preferably two in number, there being a space between the walls surrounding these openings to receive the bar. The bearing-bar furnishes a barrier, which excludes the guns and tubes lacking the complemental slots. Whatever the form of the selective engaging means, the bearing and gun preferably have means for retaining the latter in place upon the former. This retaining means may consist of ways associated with the bearing-opening and receiving projections from the gun.

As another feature of the invention, I have provided a grease-gun comprising a cylinder, a plunger movable in the cylinder for contact with a collapsible tube therein, an operating member for the plunger, such as a threaded rod extending through one end of the cylinder, and a head fitting and lying wholly within the cylinder at the opposite end and being separable therefrom by rectilinear movement. This head furnishes an abutment against which the grease-tube is collapsed, and, when removed from the cylinder, permits the introduction of the tube without disturbing the plunger-mounting. It is shown as having a slot to receive the bar across the bearing-opening with which it is to cooperate. The periphery of the plunger is best spaced from the surrounding cylinder-wall, so loose or unpackaged grease cannot be successfully used in the gun, and the operating member may have a rounded end to reduce the frictional engagement and avoid rotating the plunger with the rod, an effect which tends to break the tube and release the grease therefrom into the cylinder.

Still another feature of the invention resides in a novel lubricant-containing tube, this tube comprising a collapsible body and a nozzle formed in plural lubricant-delivering portions separated by a space to receive the selecting bar of the bearing with which the tube is to be associated. Since each passage through the nozzle may be completely surrounded by a lateral wall, there is no possibility of the escape of grease in this direction. This is especially true when the space or slot in the tube extends back into an inclined wall at the end of the tube-body, as it may to render more difficult the application to the bearing of a lubricant in an unauthorized tube.

In the accompanying drawing,

Fig. 1 shows in central longitudinal section one arrangement of the elements of my improved lubricating system, including a bearing to be lubricated and an applying gun and lubricant-tube associated therewith;

Fig. 2 is a transverse section on the line II—II of Fig. 1;

Fig. 3, an elevation of the delivery-end of the gun;

Fig. 4, a perspective view of that portion of the bearing having the receiving opening for the grease;

Fig. 5, a similar view of the nozzle of the tube;

Fig. 6, a sectional detail illustrating a modified form of the lubricant-receptacle and tube-engaging portion of the bearing, with a tube and applying gun in co-operation therewith; and Fig. 7, a perspective view of the nozzle-portion of the tube appearing in Fig. 6, together with its closing cap.

The bearing illustrated at B is of the high-speed type, a shaft 10 running upon balls 12, the active bearing-elements being within a fixed casing 14. The particular form of this bearing is not material to the present invention. In the bearing-casing is a receiving opening 16, through which such a lubricant as grease may be introduced. For the purpose of effectively forcing the grease into the bearing, the use of a gun or applying device G is desirable, this being adapted to contain a package of the grease enclosed in a collapsible receptacle or tube T and to cause the extrusion of its contents. Since the wear and general deterioration of bearings may be minimized by the application to them of the lubricant best suited to the purpose, the gun and tube are each provided with means whereby only those of a particular form may be caused to co-operate effectively with the bearing for the delivery of grease thereto. The tubes thus formed may be filled with only the approved grease, and in this way the most efficient operation and longest life of the bearing assured. The manner in which this result is achieved will now be described.

Surrounding the opening 16 of the bearing B is a plane surface 18, at each side of which are parallel recesses formed by overhanging flanges 20. These serve to retain the gun G in place while grease is being forced from it into the bearing. Extending across the opening 16 and projecting outside the surface 18 is a bar 22, this furnishing selecting means determining the form of the delivery-portions of a grease-tube and gun which may be operatively associated with the bearing to the exclusion of all others.

The grease-gun G comprises a tubular body or cylinder 24 furnishing a chamber for containing a tube T. One end of the cylinder is closed by a preferably integral head 26, through which is an axial threaded opening to receive a threaded operating rod 28 for a plunger 30 movable in engagement with a contained tube. Extending transversely of the head is a slot with overhanging walls 32, this slot receiving and retaining the rounded end 34 of the rod. When the rod is rotated, as by a crank 36 upon its outer extremity, the head 30 will be either forced in to collapse the tube T or drawn out to prepare the cylinder for the reception of another tube. In the former movement, the area of contact of the rod-end 34 with the plunger is too small to create sufficient friction to rotate said plunger, so there is no danger of the tube being broken by the grinding effect of the plunger upon it. A space is shown at 38 between the periphery of the plunger and the inner wall of the cylinder, so if an attempt were made to use loose or unpackaged grease in the gun, it would be forced back through this space and would not enter the bearing. A scale 40, graduated, for example, in ounces, may be placed upon a flattened surface 42 extending longitudinally of the rod. This scale, when referred to some such index means as the end-surface 44 of the head 26, will allow definite quantities of grease to be introduced to a bearing by the rotation of the crank 36.

The outlet-end of the gun G has two opposite, generally segmental outward projections or flanges 46, 46, between which, at 48, 48, the transverse dimension of the cylinder is such that it may be introduced longitudinally between the flanges. Then, upon turning the cylinder about its longitudinal axis, the projections 46 will lock within the flanges 20, and the gun will be positively retained in place against the reactive force of the expelled grease. To determine the extent to which the cylinder is to be rotated to produce this retaining engagement, a pin 50 may extend into one of the ways for contact with the corresponding projection 46. In this outlet-end of the cylinder 24 fits a separable head 52, which may be connected to the cylinder to prevent it from being misplaced. This connection is shown as furnished by a chain or other flexible member 54 joining eyes 56, 56 inserted in the cylinder and head. A slot 58 in the cylinder receives the head-eye when the head 52 is in operating position, as appears in Fig. 1 of the drawing, this giving some capacity for relative movement between the head and cylinder, longitudinally of the axis of the latter. The outer face of the head at 60 presents a plane surface at right-angles to the longitudinal axis of the gun and parallel to the bearing-surface 18 when said gun is in place, their contiguity preventing the escape of grease between them. If desired, a packing ring 62, of leather or other yieldable material, may be set in this end of the head to render the closure more complete. The same force which, when applied to the tube of grease, urges the cylinder-projections 46 against the flanges 20, will press the head and its ring 62 against the opposed bearing-surface to furnish a grease-tight joint. The surface 60 contains a transverse slot or depression 64, of sufficient width and depth to receive the bearing-bar 22, permitting the seating of the gun with which it is provided in delivering relation to the bearing, while barring out other guns. The cylinder 24, however, is of greater internal diameter than the length of the bar 22, so said cylinder may be rotated about its longitudinal axis after the head has engaged the bar, this permitting the locking of the projections 46 within the flanges 20. The transverse dimension of the slot 58 is such that the projections 46 may be thus engaged with the flanges 20 while the head 52 is held by the bar 22 against turning. The inner face of the head at 66 is preferably of frusto-conical form; it converging in the direction of the adjacent end of the gun, being inclined inwardly toward an axial opening 68 in the head. The opposed end 70 of the plunger 30 preferably conforms to the inner face of the head.

The tube T may be of the well-known collapsible type, of soft metal, having a cylindrical wall 72 of a diameter such that it will be received readily within the cylinder 24. The end 74 may have the usual folded closure. The wall 76 at the opposite or outer end is shown as inclined, to seat itself upon the wall 66 of the head 52. At the center of the wall 76 is a delivery-nozzle 78, of sufficient length to enter the bearing-opening 16. The association of the nozzle with the bearing is made possible by a transverse slot 80 which it contains, this slot extending through the delivery end of the nozzle to receive and counteract the excluding effect of the bearing-bar 22. Normally, or during shipping or storing, the nozzle is closed by a removable cap t.

In utilizing the system of this invention, the rod 28 of the gun G is turned back by the crank 36 until the scale 40 indicates the zero or full condition of a contained tube T. This tube, containing the chosen grease and without its cap $t$, is inserted in the cylinder 24 with its end 74 against the plunger 30. For this purpose, the head 52 of the gun will have been removed from the cylinder. It is now put in place, the head-surface 66 and the tube-wall 76 abutting. With the cylinder-portions 48, 48 opposite the flanges 20, 20, the gun is inserted between the bearing-ways and is turned until the cylinder-projections 46, 46 enter and are retained by the flanges 20, 20, the extent of this movement being determined by the contact-pin 50. During the entering movement of the gun, the complemental engaging portions furnished by the bar 22 of the bearing, on the one hand, and the slots 64 and 80 of the gun and tube, on the other, make possible the operative association of these elements, though for guns and tubes with other end-formations a barrier is furnished. With the gun and tube thus in place, the rod 28 is rotated by the crank 36 and the plunger 30 forced against the end 74 of the tube, which is thereby collapsed, as indicated at $x$ in Fig. 1, expelling the contents through the nozzle 78 and opening 16 into the bearing B. Escape of the grease past the bearing-surface 18 is prevented by the proximity of the wall-surface 60 of the gun or of the packing ring 62 to said surface 18. Leakage into the cylinder between the inner head-surface 66 and the tube-wall 76 is cut off by the pressing together of these surfaces as the tube is collapsed. Having introduced into the bearing the correct amount of grease, as indicated by the scale 40, the gun is separated from the bearing by rotation and withdrawal, the movements being opposite to those employed for their association. The use of the gun may continue until the tube has been fully collapsed and the wall 74 brought into contact with the wall 76. This complete emptying of the tube is rendered possible by the complemental relation between the end 70 of the plunger and the depression at 76 in the head 52. The tube is so deformed by its collapse that it is destroyed, as far as further utilization as a receptacle is concerned. It therefore cannot be filled for the delivery of an unauthorized grease. Upon separating the head 52 from the gun, the empty tube may be removed, a full tube substituted and the lubricating operations repeated.

It may be desirable to guard against the use in a gun of a tube with a very short nozzle or without such a delivering projection, by extending the selecting bar of the bearing out to intersect the wall-surface 66 and the inclined wall 76 of the tube. Such a structure is illustrated in Fig. 6 of the drawing, where a bar 90 is thus arranged. But with the use of a tube with the end-formation of the character previously described, there might be a tendency for the grease to be forced back along the wall of the tube from the ends of the slot which extends into the tube-wall 76 for the reception of the deeper bar 90. To avoid this, a tube R (Fig. 7) may be employed. This has a divided nozzle with independent portions 92, 92, each containing a delivering passage 94. Each opening is surrounded by a complete lateral wall extending back into the inclined portion 76 of the tube. The adjacent sides of these walls at 96, 96 have between them a slot 91 receiving the bar 90. Since the grease can flow only from the terminal openings through the passages 94, the lateral leakage just mentioned cannot occur, however far outwardly from the bearing the bar may extend.

Having described my invention, what I claim as new and desire to secure by Letters Patent of the United States is:

1. The combination with a bearing provided with an opening, of a lubricant-applying device co-operating with the opening and arranged to receive a collapsible tube containing the lubricant to be applied, the bearing having means for engagement with both the applying device and the tube.

2. The combination with a bearing provided with an opening, of a lubricant-applying device having a receiving chamber and co-operating with the opening, and a collapsible lubricant-tube situated in the chamber and arranged for the delivery of its contents to the bearing-opening, both the applying device and the tube engaging the bearing.

3. The combination with a bearing provided with an opening, of a lubricant-applying device having a receiving chamber and co-operating with the opening, and a collapsible lubricating tube situated in the chamber and arranged for the delivery of its contents to the bearing-opening, the bearing and the delivery-end-formations of the applying device and tube respectively furnishing complemental engaging means permitting the association of the device and tube with the bearing in lubricant-delivering relation to the opening, such engaging means upon the bearing preventing effective association with the opening of applying devices and tubes having end-formations different from those complemental to the engaging means of the bearing.

4. The combination with a bearing provided with an opening and retaining means associated with the opening, of a grease-gun held in co-operation with the bearing-opening by the retaining means, and a collapsible tube contained in the gun and having a nozzle extending outside the gun and into the bearing-opening.

5. The combination with a bearing provided with an opening, retaining means and a barrier associated with the opening, of a grease-gun held in co-operation with the bearing-opening by the retaining means, and a collapsible tube contained in the gun, both said gun and tube having means to counteract the excluding effect of the barrier.

6. The combination with a bearing provided with a grease-receiving opening and a bar fixed against movement upon the bearing and extending across the opening, of a grease-gun co-operating with the opening and having in its end a slot to receive the bar.

7. The combination with a bearing provided with a grease-receiving opening, ways associated with the opening and a bar fixed against movement upon the bearing and extending across said opening, of a grease-gun having projections to enter the ways and provided in its end with a slot to receive the bar.

8. The combination with a bearing provided with an opening and a bar extending across the opening, of a grease-gun co-operating with the opening and having in its end a slot to receive the bar, and a collapsible grease-tube contained in the gun and having a nozzle in which is a slot to receive the bar.

9. The combination with a bearing provided with an opening and a bar extending across the opening, of a grease-gun co-operating with the opening and having in its end a slot to receive the bar, and a collapsible grease-tube contained in the gun and having a nozzle in which are a plurality of openings and a space between the openings to receive the bar.

10. The combination with a bearing provided with an opening and a bar extending across the opening, of a grease-gun co-operating with the opening and having in its end a slot to receive the bar, and a collapsible grease-tube contained in the gun and having a nozzle in which are two openings each surrounded by a wall, the adjacent walls of the openings having between them a space to receive the bar.

11. The combination with a bearing provided with an opening and a bar extending across the opening, of a grease-gun co-operating with the opening and having an inclined surface converging toward said opening and a slot through said surface to receive the bar.

12. The combination with a bearing provided with an opening and a bar extending across the opening, of a grease-gun co-operating with the opening and having an inclined surface converging toward said opening and a slot through said surface to receive the bar, and a collapsible grease-tube contained in the gun and having an inclined wall contacting with the inclined surface of the gun, in which wall is a slot to receive the bar.

13. The combination with a bearing provided with an opening and a bar extending across the opening, of a grease-gun co-operating with the opening and having an inclined surface converging toward said opening and a slot through said surface to receive the bar, and a collapsible grease-tube contained in the gun and having an inclined wall contacting with the inclined surface of the gun and a divided nozzle projecting from the inclined wall, there being a slot between the divided portions of the nozzle and extending into the inclined wall.

14. The combination with a bearing provided with an opening and a bar fixed against movement upon the bearing transversely of the opening, of a grease-gun provided with a cylinder, a plunger movable in the cylinder and operated through one end thereof and a head fitting the interior of the cylinder and separable from the opposite extremity thereof, said head having a slot to receive the bar.

15. The combination with a bearing provided with an opening and a bar associated with the opening, of a grease-gun provided with a cylinder, a plunger movable in the cylinder and operated through one end thereof and a head separable from the opposite extremity of the cylinder, said head having a slot to receive the bar, the cylinder-wall engaging the bearing outside the ends of the bar.

16. The combination with a bearing provided with an opening and a bar associated with the opening, of a grease-gun provided with a cylinder, a plunger movable in the cylinder and operated through one end thereof and a head separable from the opposite extremity of the cylinder, said head having a slot to receive the bar, and a collapsible grease-tube contained in the gun and having a nozzle extending through the head and in which is a slot to receive the bar.

17. The combination with a bearing provided with an opening, ways associated with the opening and a bar extending across the opening, of a grease-gun provided with a cylinder upon which are opposite projections adapted to enter the ways and an intermediate portion allowing the insertion and withdrawal of the gun laterally between the ways, a plunger movable in the cylinder and a separable head for one end of the cylinder, said head having a slot to receive the bar, the cylinder-wall lying outside the ends of the bar.

18. A grease-gun for bearings comprising a cylinder, grease-expelling means having a portion extending through one end of the cylinder, and a head fitting the cylinder at the opposite extremity, said head being provided with an opening through which grease may be discharged to a bearing and with means for engaging said bearing and preventing rotation of the head thereon, the cylinder and head being separable by rectilinear movement.

19. A grease-gun for bearings comprising a cylinder provided with means for locking it against displacement longitudinally of its axis upon the bearing, grease-expelling means having a portion extending through one end of the cylinder, and a head fitting the cylinder at the opposite extremity, said head being provided with an opening through which grease may be discharged to the bearing and with means for engaging said bearing and preventing rotation of the head thereon, the cylinder and head having a capacity for relative movement axially of the cylinder upon the application of pressure by the expelling means.

20. The combination with a bearing, of a grease-gun comprising a cylinder, a plunger movable in the cylinder, an operating member for the plunger extending through one end of the cylinder and a head fitting within the cylinder at the opposite extremity and being separable therefrom, the head having its outer wall situated at substantially right angles to the axis of the cylinder in contact with the bearing and its inner wall inclined toward the axis and toward said outer wall and a grease-tube having a wall seated upon and inclined similarly to the inclined wall of the head, said tube being thus positioned for engagement by the plunger.

21. A grease-gun comprising a cylinder, a plunger movable in the cylinder, an operating member for the plunger extending through one end of the cylinder, and a head fitting within the cylinder at the opposite extremity and being separable therefrom and provided with a transverse slot in its outer face.

22. A grease-gun comprising a cylinder having at one end opposite projections, a plunger movable in the cylinder, an operating member for the plunger extending through the end of the cylinder opposite the projections, and a head fitting within the cylinder at the projections and being separable therefrom.

23. A grease-gun comprising a cylinder, a plunger movable in the cylinder, said plunger being provided with a conical end for contact with a collapsible grease-tube within the cylinder and being spaced at its periphery from the cylinder-wall, an operating member for the plunger extending through one end of the cylinder, and a head fitting separably within the cylinder at the opposite extremity and having a recess to receive the plunger-end.

24. A lubricant-containing tube comprising a collapsible body, and a divided nozzle having two delivery-openings with a space separating the openings in the divided portions of the nozzle.

25. A lubricant-containing tube comprising a collapsible body, an inclined wall at one end of the body, and a nozzle projecting from the inclined wall and provided with two delivery-openings each surrounded by a wall, there being a space extending between the surrounding walls and into the inclined wall of the tube.

26. A lubricant-containing tube comprising a collapsible wall, and a nozzle formed in plural lubricating-delivering portions, said portions being separated by a space extending through the delivery-end of the nozzle.

27. The combination with a bearing provided with an opening, of a lubricant-applying device cooperating with the opening and having a receiving chamber and lubricant-extruding means, and a collapsible lubricant-tube situated in the chamber in engagement with the bearing and acted upon by the extruding means.

HARRY A. RISING.